US012566098B2

(12) United States Patent
Hoylman et al.

(10) Patent No.: US 12,566,098 B2
(45) **Date of Patent: *Mar. 3, 2026**

(54) SUB-SLAB MONITOR, SYSTEM, AND METHOD OF USING THE SAME

(71) Applicant: Vapor Products Group, LLC, Troy, MI (US)

(72) Inventors: Kyle Hoylman, Louisville, KY (US); Chris Bonniwell, Louisville, KY (US); Chris Ferguson, Louisville, KY (US)

(73) Assignee: VAPOR PRODUCTS GROUP, LLC, Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/639,145

(22) Filed: Apr. 18, 2024

(65) Prior Publication Data

US 2024/0264026 A1 Aug. 8, 2024

Related U.S. Application Data

(63) Continuation of application No. 17/962,255, filed on Oct. 7, 2022, now Pat. No. 11,988,570.

(60) Provisional application No. 63/253,653, filed on Oct. 8, 2021.

(51) Int. Cl.
| | |
|---|---|
| *G01L 19/14* | (2006.01) |
| *E02D 33/00* | (2006.01) |
| *G01L 13/00* | (2006.01) |
| *G01L 19/08* | (2006.01) |

(52) U.S. Cl.
CPC ............ *G01L 19/142* (2013.01); *E02D 33/00* (2013.01); *G01L 13/00* (2013.01); *G01L 19/086* (2013.01)

(58) Field of Classification Search
CPC ..... G01L 13/00; G01L 19/086; G01L 19/142; E02D 33/00
See application file for complete search history.

(56) References Cited

U.S. PATENT DOCUMENTS

| | | | | |
|---|---|---|---|---|
| 10,869,110 B2 * | 12/2020 | Schwie | .................. | G01L 21/00 |
| 2012/0328378 A1 | 12/2012 | Hatton et al. | | |
| 2014/0139342 A1 * | 5/2014 | Brown | .................... | F24F 7/065 |
| | | | | 340/603 |

(Continued)

FOREIGN PATENT DOCUMENTS

| | | |
|---|---|---|
| EP | 2 919 007 A1 | 9/2015 |
| WO | 2019/157041 A1 | 8/2019 |

OTHER PUBLICATIONS

European Patent Office, Supplementary European Search Report issued in corresponding Application No. EP 22 87 9344 dated Oct. 23, 2025.

*Primary Examiner* — Andre J Allen
(74) *Attorney, Agent, or Firm* — Stites & Harbison, PLLC; Terry L. Wright; James R. Hayne

(57) ABSTRACT

A sub-slab monitor includes a housing configured to extend through a foundation such that an upper surface of the housing is in contact with an indoor air environment and a lower surface of the housing is in contact with a sub-slab environment. The housing includes an upper end cap, a lower end cap, a body extending between the upper end cap and the lower end cap. A pressure sensor contained within the housing is configured to measure a differential pressure between the indoor air environment and the sub-slab environment via a vent port defined in the lower end cap.

6 Claims, 5 Drawing Sheets

(56) References Cited

U.S. PATENT DOCUMENTS

| | | |
|---|---|---|
| 2014/0216143 A1 | 8/2014 | Salmi et al. |
| 2019/0141421 A1 | 5/2019 | Schwie |
| 2022/0235532 A1* | 7/2022 | Vuyk, Jr. ............... G01K 13/00 |

* cited by examiner

SUB-SLAB MONITOR, SYSTEM, AND METHOD OF USING THE SAME

RELATED APPLICATIONS

This application is a continuation of U.S. patent application Ser. No. 17/962,255, filed Oct. 7, 2022, which claims priority from U.S. Provisional Application Ser. No. 63/253,653, filed Oct. 8, 2021, the entire disclosures of which is incorporated herein by this reference.

TECHNICAL FIELD

The present invention relates generally to active soil depressurization systems. More particularly, the invention relates to a sub-slab monitor, system, and method of continuous monitoring of an induced pressure differential beneath the foundation of a building.

BACKGROUND

Soil gas intrusion is the migration of naturally occurring (e.g., radon) or anthropogenic (e.g., trichloroethylene) contaminants present in soil gases into adjacent inhabited structures. Radon is the second leading cause of lung cancer in the United States, and is nearly an ubiquitous threat for habitable structures across the country. Anthropogenic chemical vapor intrusion has become an increasingly concerning and prevalent exposure pathway associated with environmental contaminated sites across the country and the world. The dominant physical mechanism for the intrusion is advection resulting from pressure differentials between a building and the underlying soils. Both sources of soil gas intrusion share a common solution; the installation of active soil depressurization (ASD) systems. ASDs are designed to manipulate the pressure differential such that the dominant flow of soil gas bypasses the occupied areas of the building by depressurizing beneath the structure and exhausting the contaminant(s) to the atmosphere. A successful ASD will either induce such negative pressure across the entirety of the building foundation or in a specific region should the contaminant be localized.

Critical to the successful performance of an ASD system is the induction of a negative pressure differential across the foundation throughout the entirety or area of focus. The pressure field extension (PFE) describes the extent of the induced pressure field at distances extending from the point(s) of induced suction. Traditionally, such measurements are made by drilling small holes in the foundation at varying distances from the suction point, and measuring the pressure differential utilizing handheld equipment (e.g. digital micromanometer) to verify a sufficient induced pressure differential (typically greater than 1 Pascal or 0.004" Water Column) is present throughout the target area. However, once verified, ongoing monitoring of the PFE is typically not performed.

Continuously maintaining the pressure differential throughout varying environmental conditions (e.g. changing barometric pressures, seasonal temperature stack effects, precipitation, wind loads, etc.) is critical to ensure the continuous protection of inhabitants. Current standards for ASD systems require alarm notifications to notify inhabitants of system failures. Telemetric solutions are capable of providing 24/7/365 monitoring of ASD operation and performance. Currently, monitoring and performance of ASD is largely limited to operation of the equipment and/or system induced operating pressure differential. However, there is not currently a solution to provide long-term, independent monitoring of the actual induced pressure differential beneath the building foundation.

SUMMARY

The present invention is, in part, directed to a sub-slab monitor for monitoring induced pressure differential beneath the foundation of a building. One or more sub-slab monitors are used to measure the pressure differential between the sub-slab and the indoor environments and transmit the data to a central computer for monitoring. Such monitoring can be for long-term system deployment or for short-term diagnostic purposes.

According to some exemplary embodiments, a sub-slab monitor includes a housing configured to extend through a foundation such that an upper surface of the housing is in contact with an indoor air environment and a lower surface of the housing is in contact with a sub-slab environment. A pressure sensor is contained within the housing, and the pressure sensor is configured to measure a differential pressure between the indoor air environment and the sub-slab environment. Electronics are contained within the housing and include communication circuitry for communicating differential pressure data from the pressure sensor to a computer and a battery.

According to some exemplary embodiments, the housing includes an upper end cap, a lower end cap, and a body extending between the upper end cap and the lower end cap. Each of the upper end cap and the lower end cap include a vent port through which the pressure sensor is able to measure the differential pressure between the indoor air environment and the sub-slab environment. According to some particular embodiments, the vent port is a hydrophobic vent port.

According to some exemplary embodiments, the upper end cap is larger than the body so as to function as a flange which can be sealed to the foundation.

According to some exemplary embodiments, the lower end cap has a diameter substantially the same as a diameter of the body.

According to some exemplary embodiments, the sub-slab monitor further includes a metal flange positioned over the upper surface of the housing.

According to some exemplary embodiments, the communication circuitry wirelessly communicates with a central computer.

According to some exemplary embodiments, the electronics further include an antenna for wirelessly communicating with the central computer.

According to some exemplary embodiments, the battery is configured to support operation of the sub-slab monitor for at least a year.

According to some exemplary embodiments, a system for sub-slab monitoring includes a central computer including a communications module and a processor and a plurality of sub-slab monitors. Each sub-slab monitor includes a housing configured to extend through a foundation such that an upper surface of the housing is in contact with an indoor air environment and a lower surface of the housing is in contact with a sub-slab environment, a pressure sensor contained within the housing, and communication circuitry for communicating differential pressure data from the pressure sensor to the central computer. The pressure sensor is configured to measure a differential pressure between the indoor air environment and the sub-slab environment.

According to some exemplary embodiments, the sub-slab monitors communicate with the central computer via a wireless connection.

In some exemplary implementations of the present invention, a method for monitoring differential pressure between an indoor air environment above a foundation and a sub-slab environment below the foundation includes providing one or more sub-slab monitors and installing the one or more sub-slab monitors through the foundation. Each sub-slab monitor includes a housing, and a pressure sensor contained within the housing, with the pressure sensor configured to measure a differential pressure between the indoor air environment and the sub-slab environment. As such, when installed, an upper surface of the housing is in contact with the indoor air environment and a lower surface of the housing is in contact with the sub-slab environment. The exemplary method further includes uploading differential pressure data from the one or more sub-slab monitors onto a central computer, and monitoring the differential pressure data to determine if a minimum differential pressure is maintained.

Some exemplary implementations further include the step of installing a metal flange over the one or more sub-slab monitors so as to be substantially flush with the foundation.

According to some exemplary implementations, each of the one or more sub-slab monitors are installed at a location remote from a point of induced suction.

According to some exemplary implementations, the step of installing the one or more sub-slab monitors includes coring a hole through the foundation and inserting the sub-slab monitor through the hole until the lower surface of the housing is in contact with the sub-slab environment.

According to some exemplary embodiments, the housing of the one or more sub-slab monitors includes an upper end cap, a lower end cap, and a body extending between the upper end cap and the lower end cap, each of the upper end cap and the lower end cap including a vent port through which the pressure sensor is able to measure the differential pressure between the indoor air environment and the sub-slab environment. In some particular implementations, the method further includes a step of applying a sealant beneath the upper end cap of the one or more sub-slab monitors to seal the sub-slab monitor to the foundation.

According to some exemplary implementations, the one or more sub-slab monitors further include a battery configured to provide continuous monitoring of the differential pressure for at least a year.

According to some exemplary implementations, the pressure sensors measures a pressure differential every 15 minutes, and the differential pressure data is uploaded every hour.

Some exemplary implementations further include a step of issuing an alarm notification if the differential pressure measured by the one or more sub-slab monitors is less than the minimum differential pressure.

Some exemplary implementations further include a step of applying a test vacuum at one or more locations within the foundation after installing the one or more sub-slab monitors to determine a preferred point of induced suction.

DESCRIPTION OF EXEMPLARY EMBODIMENTS

The present invention includes a sub-slab monitor, system, and method of monitoring of an induced pressure differential beneath the foundation of a building. The sub-slab monitor is embedded and kept in place within the foundation for continuous monitoring of the pressure differential over an extended period of time. One or more sub-slab monitors are used to measure the pressure differential between the sub-slab and the indoor environments and transmit the data to a central computer for monitoring. Such monitoring can be for long-term system deployment or for short-term diagnostic purposes.

Figure 1:
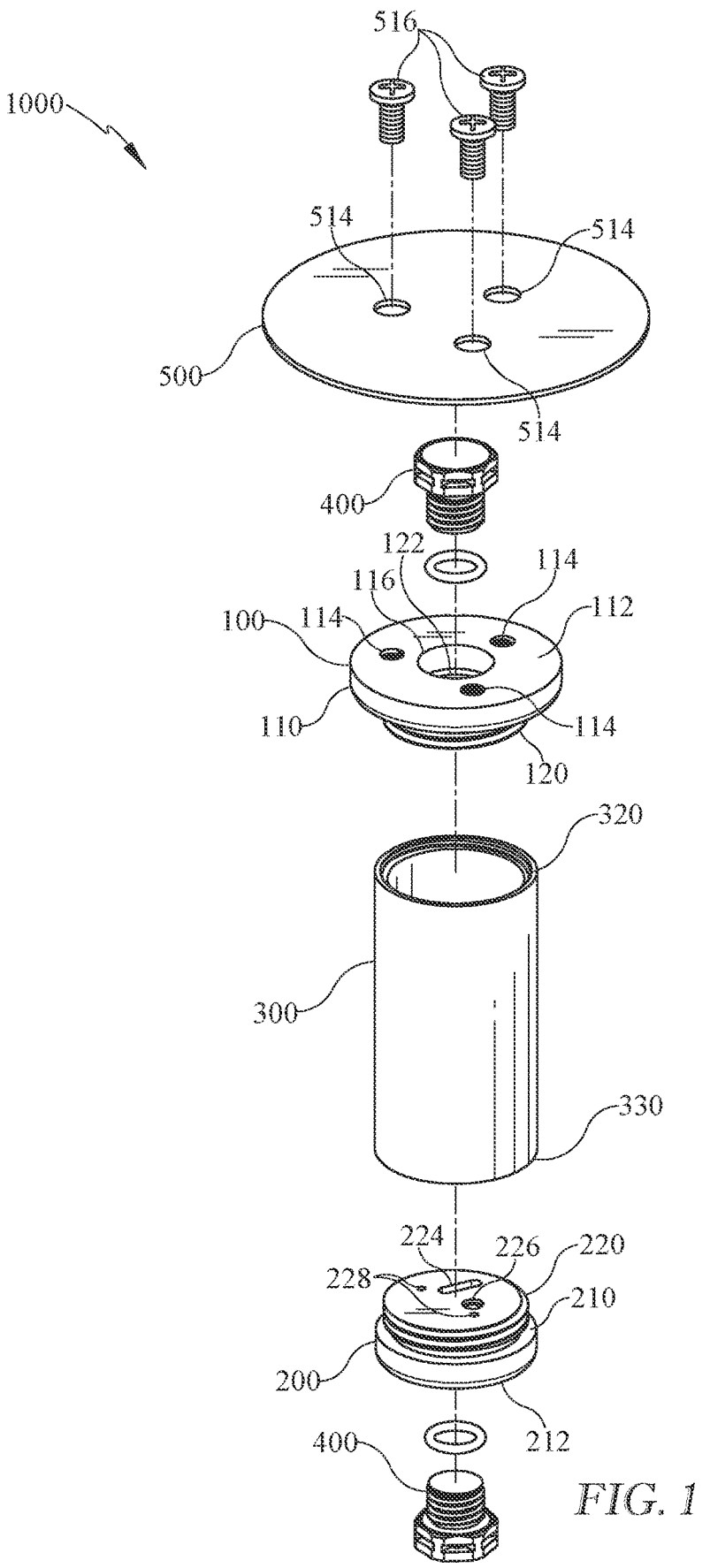
FIG. 1 is perspective exploded view of an exemplary sub-slab monitor made in accordance with the present invention.
Figure 2:
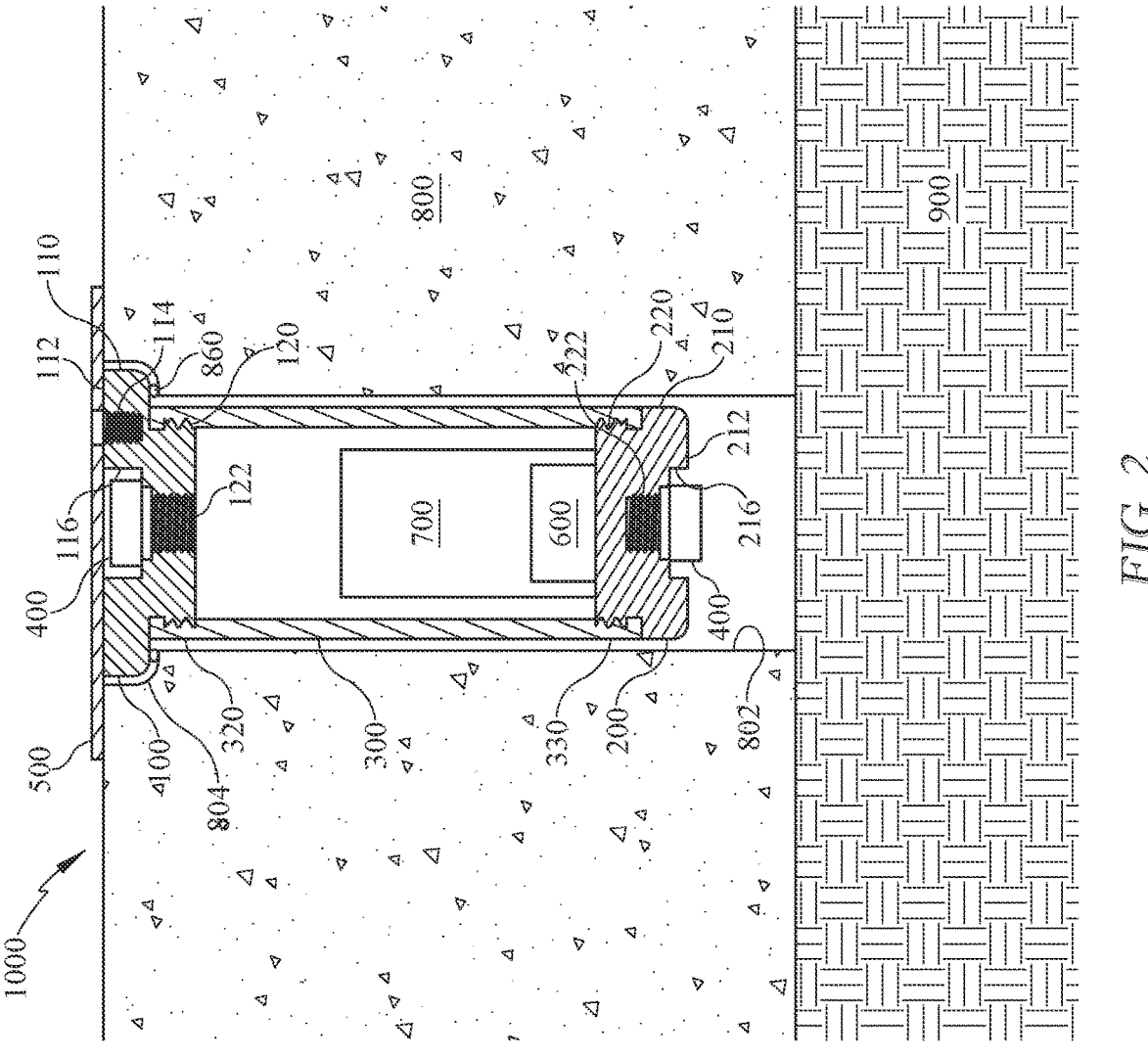
FIG. 2 is a side sectional view of the sub-slab monitor of FIG. 1 installed within a hole drilled through a foundation.

Referring first to FIGS. 1 and 2, one exemplary sub-slab monitor 1000 made in accordance with the present invention utilizes a housing configured to extend through a foundation 800 such that an upper surface of the housing is in contact with an indoor air environment and a lower surface of the housing is in contact with a sub-slab environment. The exemplary housing includes an upper end cap 100, a lower end cap 200, and a body 300 extending between the upper end cap 100 and the lower end cap 200. As shown in FIG. 2, the housing encapsulates a pressure sensor 600 and internal electronics 700 with both end caps 100, 200 having openings to their respective environments (i.e. indoor air and sub-slab) to allow the pressure sensor 600 to measure the differential pressure between the indoor air environment and the sub-slab environment, as discussed further below. However, the ends caps 100, 200 are also equipped with hydrophobic membrane vent ports 400 to protect internal electronics 700 from exposure to moisture contained within the environments. An optional metal flange 500 is also included to protect the sub-slab monitor from foot or vehicle traffic in the building space (e.g. warehouse forklift traffic). Further features and advantages of the sub-slab monitor of the present invention will now be discussed in detail.

Referring still to FIGS. 1-2, the exemplary upper end cap 100 includes a body 110 with an upper surface 112 and a threaded shaft 120 which extends away from the body 110 opposite from the upper surface 112. The upper surface 112 of the body 110 defines a cavity 116 which extends through the body 110, and a central hole 122 is defined through the length of the threaded shaft 120. The central hole 122 is connected to the cavity 116, and in this way, the cavity 116 and central hole 122 provide an opening through the upper end cap 100 to thereby allow the pressure sensor 600 contained within the sub-slab monitor to measure the indoor air environment, as discussed further below.

A hydrophobic membrane vent port 400 is further included with the upper end cap 100 to protect the electronics 700 of the sub-slab monitor from exposure to moisture contained within the indoor air environment. Specifically, and as perhaps best shown in FIG. 2, the central hole 122 is threaded and the hydrophobic vent port 400 is inserted into and secured via this threaded opening. The cavity 116 provides clearance for the head of the hydrophobic vent port 400 to be recessed or flush with the upper surface 112 of the upper end cap 100. One possible hydrophobic vent port for use with the upper end cap 100 of the present invention is a Circular Metric Connector (e.g., part #VENT-PS1NBK-N8001) manufactured by Amphenol LTW, but other vents ports can be used without departing from the spirit and scope of the present invention. Furthermore, in some embodiments, no such vent port is included with the upper end cap 100.

As shown in FIG. 1, three holes 114 are defined so as to extend downward from the upper surface 112 and partway through the body 110. The metal flange 500 similarly defines three holes 514 which align with the three holes 114 in the upper end cap 100 to allow fasteners 516, e.g., screws, to thereby secure the metal flange to the upper end cap 100.

Referring once again to FIGS. 1 and 2, the exemplary lower end cap 200 includes a body 210 with a lower surface 212 and a threaded shaft 220 which extends away from the body 210 opposite from the lower surface 212. As shown in FIG. 2, the lower surface 212 of the body 210 defines a cavity 216 which extends partway through the body 210 from the lower surface 212, and a central hole 222 extends partially through the threaded shaft 220 with the central hole 222 having its own threading. Similar to the upper end cap 100, the cavity 216 in the body 210 connects with the central hole 222 of the shaft 220 and provides an opening through the lower end cap 200 to the pressure sensor 600 contained within the sub-slab monitor. Unlike the upper end cap 100, and as perhaps best shown in FIG. 1, the shaft 220 of the lower end cap 200 also defines a channel 226 which connects to the central hole 222 and is configured to affix to one port of the sensor to the sub-slab environment. The central hole 222 and channel 226 thereby collectively form an isolation duct. Of note, a recess within the channel 226 allows for an o-ring to seal the sensor port to the opening, thus isolating it from the interior environment, as discussed further below.

Similar to the upper end cap 100, in some exemplary embodiments, a hydrophobic membrane vent port 400 is further provided with the lower end cap 200 and secured via the threaded central hole 222 with the cavity 216 providing clearance for the head of the hydrophobic vent port 400 to be recessed or flush with the lower surface 212 of the lower end cap 200. On possible hydrophobic vent port for use with the lower end cap 200 of the present invention is a Circular Metric Connector (e.g., part #VENT-PS1NBK-N8001) manufactured by Amphenol LTW, but other similar vents ports can be used without departing from the spirit and scope of the present invention. Furthermore, in some embodiments, no such vent port is included with the lower end cap 200.

Referring still to FIG. 1, the shaft 220 of the lower end cap 200 further defines an elongated channel 224 which connects to the second port of the pressure sensor 600 and allows the pressure sensor 600 to measure the pressure inside the sub-slab monitor that has equilibrated with the environment above the sub-slab monitor through the central hole 122 of the upper end cap 100, as discussed further below.

Referring still to FIG. 1, two additional holes 228 are provided to secure the pressure sensor 600 and electronics 700 to the lower end cap 200. Of course, the particular means of securing the pressure sensor 600 and/or electronics 700 within the body of the sub-slab monitor is not limited and can be modified by one skilled in the art without departing from the spirit and scope of the present invention.

Referring once again to FIGS. 1 and 2, the exemplary body 300 is a tube configured for the upper end cap 100 to be removably connected to a first end 320 of the body 300 and the lower end cap 200 to be removably connected to a second end 330 of the body 300. Specifically, as shown with respect to the first end 320 in FIG. 1, the first end 320 of the body 300 has internal threads configured to engage the threaded shaft 120 of the upper end cap 100. The second end 330 of the body 300 is similarly threaded to engage the threaded shaft 220 of the lower end cap 200. In some exemplary embodiments, the body 300 is made of schedule 40 PVC pipe, but other materials can be used without departing from the spirit and scope of the present invention.

As previously mentioned, and as shown in FIG. 2, the pressure sensor 600 and electronics 700 of the sub-slab monitor 1000 are housed within the body 300. Specifically, in a preferred embodiment, the pressure sensor 600 and electronics 700 are secured to the lower end cap 200 via the mounting holes 228 and then the lower end cap 200, body 300, and upper end cap 100 are attached to form a substantially closed housing for the sub-slab monitor 1000.

Figure 4:
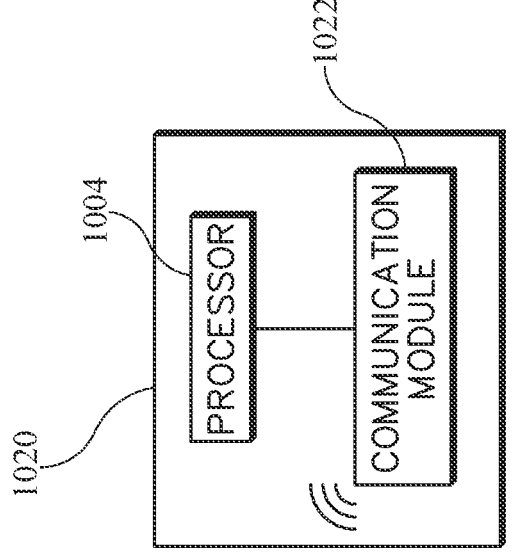
FIG. 4 is a schematic diagram of the sub-slab monitor in communication with a central computer.
Figure 4:
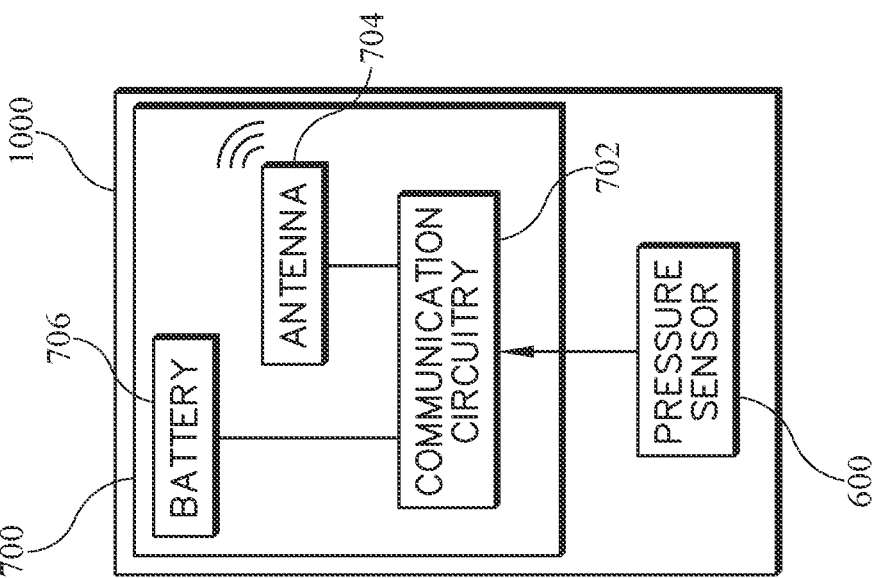

Referring now to FIG. 4, the pressure sensor 600 is electronically connected to the electronics 700 which consist of a microprocessor control board equipped with wireless communication circuitry 702, an antenna 704, and a battery 706.

The communication circuitry 702 is configured to communicate differential pressure data from the pressure sensor 600 to a central computer 1020. The exemplary central computer 1020 shown in FIG. 4 includes a communications module 1022 for uploading the differential pressure data from the sub-slab monitor 1000 and a processor 1024 configured to monitor the differential pressure data to determine if a minimum differential pressure is maintained between the indoor air environment above the foundation and the sub-slab environment below the foundation. In some embodiments, data from the sub-slab monitor 1000 is uploaded to cloud storage where it can be accessed by a remote computer (e.g., a cloud computer or the central computer 1020). The exemplary battery 706 included in the sub-slab monitor 1000 is configured to support operation for a predetermined lifespan. For example, in some exemplary embodiments, the battery 706 is designed to maintain power to the sub-slab monitor 1000 for about eighteen months to reliably support operation for a minimum of one year.

Figure 5:
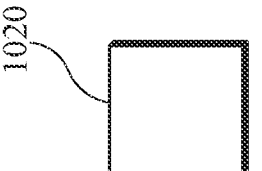
FIG. 5 is a schematic diagram of a system of sub-slab monitors placed throughout a building and in communication with a computer.
Figure 5:
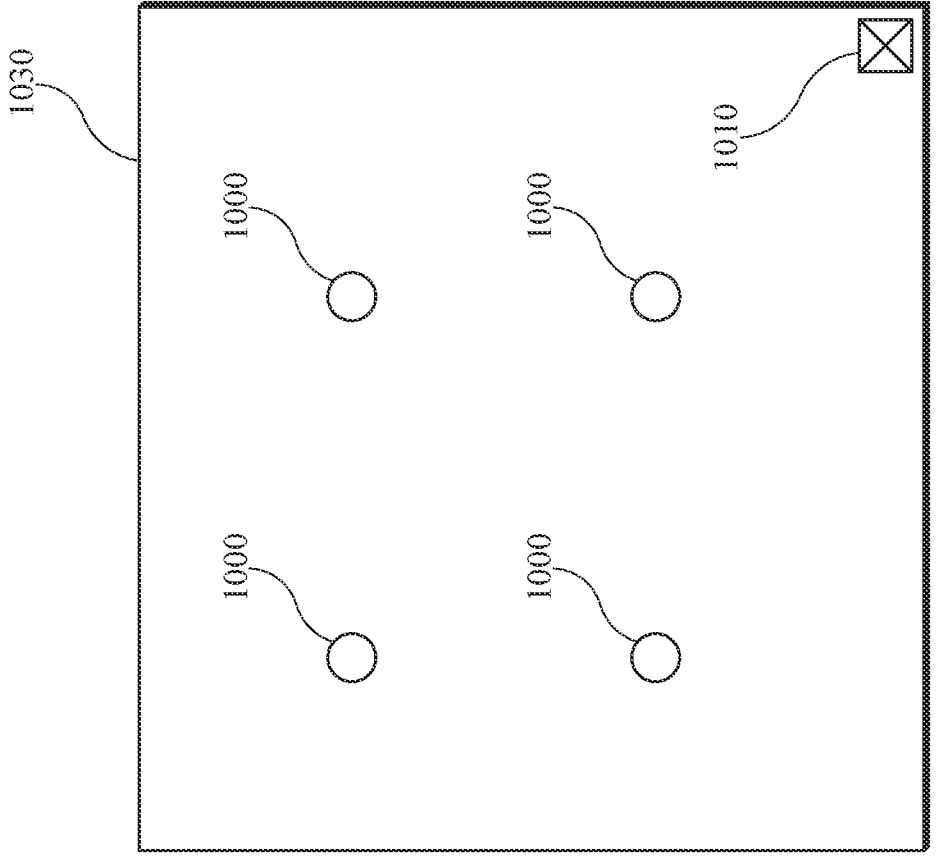

Referring now to FIG. 5, according to some embodiments of the present invention, one or more sub-slab monitors 1000 are provided within a building 1030, such as a warehouse. More specifically, in the embodiment shown in FIG. 5, there are four sub-slab monitors 1000 which are each installed at a location remote from a point of induced suction 1010 as part of an active soil depressurization (ASD) system. In operation, a fan or other similar device, creates a negative pressure in the sub-slab environment at the point of induced suction 1010. This negative pressure is designed to manipulate the pressure differential such that the dominant flow of soil gas bypasses the occupied areas of the building 1030 by depressurizing beneath the structure and exhausting contaminant(s) to the atmosphere. By monitoring the differential pressure between the indoor air environment and the sub-slab environment, the sub-slab monitors 1000 are used to ensure that sufficient suction is provided at the point of induced suction 1010 to maintain the appropriate pressure differential across the entire foundation of the building 1030. Of course, depending on the size and configuration of the foundation, more or less sub-slab monitors 1000 may be utilized, including only one sub-slab monitor 1000.

With respect to installation of the sub-slab monitors, in one exemplary implementation of the method of the present invention, and referring now to FIG. 2, a hole 802 (e.g., a 2.0 inch diameter hole) is first cored through the foundation slab 800 to create a pathway between the indoor air environment and the sub-slab environment 900. The sub-slab monitor 1000 is then provided and inserted into the cored hole 802 and the sub-slab monitor is sealed to the foundation 800 utilizing a sealant 860, such as silicon caulk, beneath the body 110 of the upper end cap 100. To this end, as shown in FIG. 2, the body 110 of the upper end cap 100 has an appreciably larger diameter than the cylindrical body 300 such that the body 110 of the upper end cap 100 functions as a flange for the upper end cap 100. In some embodiments, rather than simply coring a hole, a temporary or permanent port is installed in foundation which serves as a connective pathway between the indoor environment and the sub-slab environment. The sub-slab monitor is then connected, either directly or via an interconnecting tube, to the port.

Figure 3:
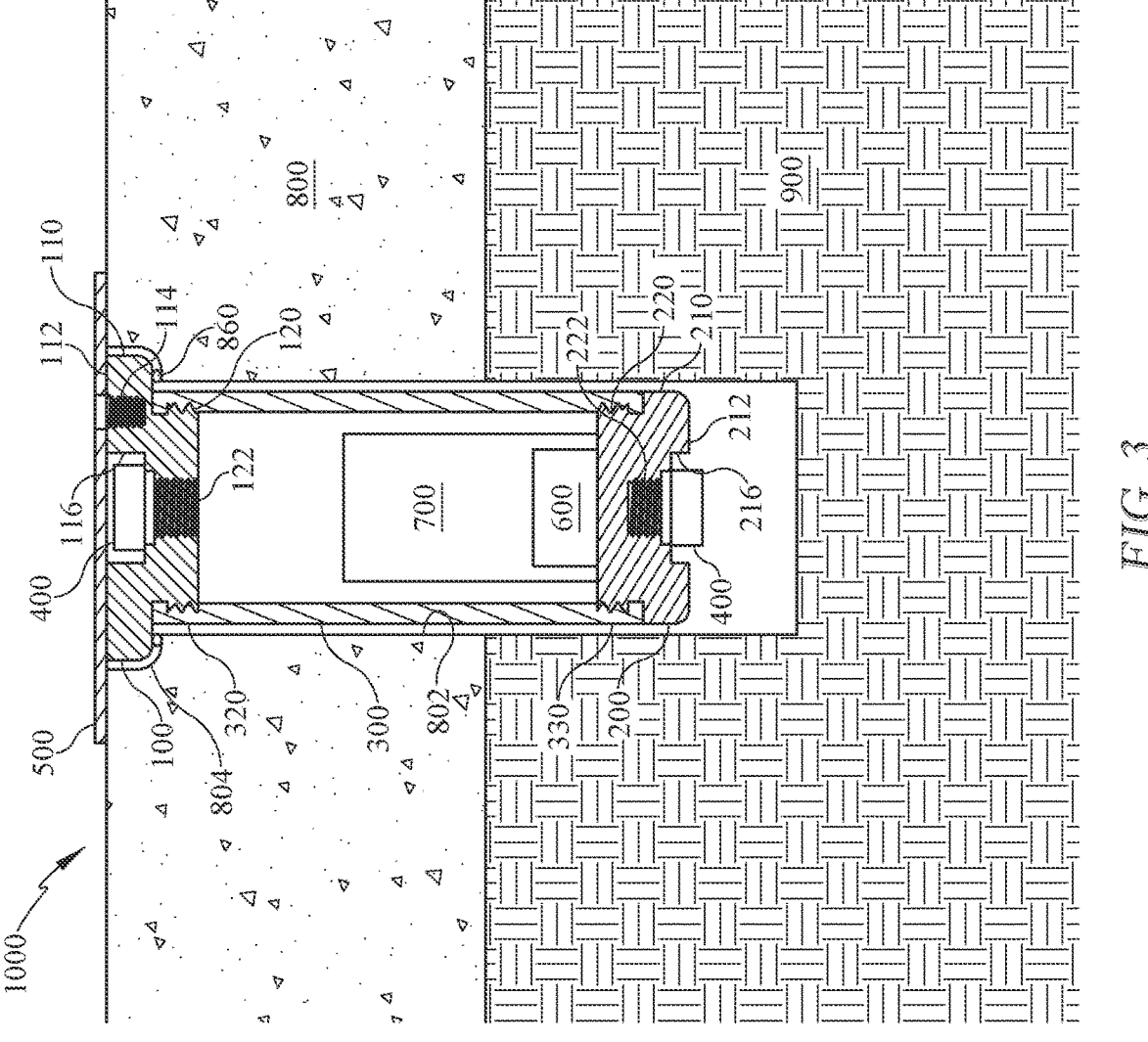
FIG. 3 is a side sectional view of the sub-slab monitor of FIG. 1 installed within a hole drilled through a foundation and extending into the underlying sub-slab material

According to some implementations of the present invention, and referring now to FIG. 3, sub-slab material 900 may also need to be removed or displaced to allow for the sub-slab monitor to be completed installed. For example, when the foundation slab 800 has a thicknesses less than 6.0 inches, additional sub-slab material 900 is removed, or otherwise displaced, in order to provide a hole of sufficient depth to house the sub-slab monitor 1000. Of course, the necessary depth of the hole is based on the dimensions of a sub-slab monitor 1000 and may vary without departing from the spirit and scope of the present invention.

As shown in FIGS. 2 and 3, the sub-slab monitor 1000 of the present invention is preferably installed flush with the surface of the foundation 800 by coring a recess 804 in the foundation 800. The size of the recess 804 is based on the dimensions of the body 110 of the upper end cap 100 and may vary without departing from the spirit and scope of the present invention. Regardless, the metal flange 500 can optionally be installed over the upper end cap 100 to protect the monitor from foot or vehicle traffic in the building space (e.g. warehouse forklift traffic).

Referring now to FIGS. 2, 4, and 5, once the one or more sub-slab monitors 1000 are installed, the interior of each of the sub-slab monitors 1000 equilibrates in pressure with the indoor air environment through the vent port 400 in the upper end cap 100. Of note, the sealant 860 applied beneath the upper end cap 100 prevents any leakage between the indoor environment and the sub-slab environment through the hole 802 in the foundation 800 exterior to the sub-slab monitor 1000. The pressure sensor 600, which is attached to the lower end cap 200, measure this indoor pressure through the port connected to the elongated channel 224 (shown in FIG. 1) defined in the lower end cap 200. Specifically, while the port is connected to a portion of the elongated channel 224, there is sufficient room in the elongated channel 224 to allow the port to still measure the pressure in the interior of the sub-slab monitor 1000. The other port of the pressure sensor 600 then measures the sub-slab environment through the isolation duct formed by the central hole 222, channel 226 (shown in FIG. 2), and vent port 400 in the lower end cap 200. The differential pressure data from the one or more sub-slab monitors 1000 is then transmitted from the sub-slab monitor 1000 by the communication circuitry 702 and antenna 704 and uploaded at the central computer 1020.

The central computer 1020 is thereby able to monitor the differential pressure data between the indoor air environment above the foundation and the sub-slab environment below the foundation throughout the operation of the sub-slab monitors 1000. As previously mentioned, the battery 706 is configured to support operation for a predetermined lifespan (e.g., at least a year). As such, the sub-slab monitors 1000 are intended to be exchanged annually with replacements as part of an operations, maintenance, and monitoring (OM&M) program. Of course, the particular battery lifespan is chosen depending on project parameters, such as the frequency at which pressure measurements are taken, as discussed further below.

According to some embodiments, the sub-slab monitors 1000 are calibrated and powered on prior to shipment for installation. The standard device configuration includes a RF LoRa transmitter operating at 915 Mhz. This configuration is equipped to integrate with a controller which serves as the communication backbone for cellular data transmission to cloud data storage and a web-based user interface. End users can utilize the UI for data analysis and to establish performance alarm conditions (e.g., a differential pressure measured by a sub-slab monitor which is less than a minimum differential pressure) and notification parameters (e.g. email or text notification). Optional configurations can include either WiFi or Bluetooth communication to eliminate the need for intermediate communication equipment.

One exemplary device configuration collects a pressure differential measurement every 15 minutes, with compiled measurements transmitted to the cloud every 60 minutes. Alternative measurement/transmittal frequencies can be programmed to meet the needs of the project (e.g. high density data/short duration, low density data/long duration, etc.).

An alternate utilization of the exemplary sub-slab monitors 1000 is for diagnostic evaluations of building conditions. Such diagnostics often are performed in advance of an ASD installation to facilitate the design of the system. For such analysis, a plurality of sub-slab monitors 1000 are deployed across a foundation in substantially the same manner discussed above. Then, a test vacuum is applied at one or more locations within the foundation to monitor short-term changes in the pressure differentials measured by the plurality of sub-slab monitors 1000. From the one or more locations tested, a preferred point of induced suction can be chosen which provides the best pressure differentials as measured by the plurality of sub-slab monitors 1000.

Although the above disclosure is focused on pressure measurements, it is contemplated that a sub-slab monitor made in accordance with the present invention can include other sensors used instead of, or in conjunction with, the pressure sensors described above without departing from the spirit and scope of the present invention. For example, an exemplary sub-slab monitor may further include environmental sensors to measure ambient conditions (e.g., temperature, relative humidity, barometric pressure, and VOC) and/or motion sensors to monitor motion (e.g., device tamper indication). The data from these additional sensors can then also be transmitted as device data.

One of ordinary skill in the art will recognize that additional embodiments are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and may be made without departing from the spirit or scope of the claimed invention.

What is claimed is:

1. A sub-slab monitor comprising:
   a housing configured to extend through a foundation such that an upper surface of the housing is in contact with an indoor air environment and a lower surface of the housing is in contact with a sub-slab environment, the housing including an upper end cap, a lower end cap, the lower end cap defining a channel providing an opening to the sub-slab environment, and a body extending between the upper end cap and the lower end cap;

a sub-slab vent port secured to a lower surface of the lower end cap, the sub-slab vent port providing a barrier between the channel defined in the lower end cap and the sub-slab environment;

a pressure sensor contained within the housing, the pressure sensor configured to measure a differential pressure between the indoor air environment and the sub-slab environment via the sub-slab vent port defined in the lower end cap; and electronics contained within the housing, the electronics including communication circuitry for communicating differential pressure data from the pressure sensor to a computer, and a battery;

wherein the upper end cap is larger than the body so as to function as a flange which can be sealed to the foundation.

2. The sub-slab monitor of claim 1, wherein the sub-slab vent port is a hydrophobic vent port.

3. The sub-slab monitor of claim 1, wherein the lower end cap has a diameter the same as a diameter of the body.

4. A sub-slab monitor comprising:

a housing configured to be positioned within a hole defined through a foundation dividing an indoor air environment and a sub-slab environment, the housing including a lower end cap in contact with the sub-slab environment, the lower end cap defining a channel providing an opening to the sub-slab environment;

a pressure sensor contained within the housing, the pressure sensor having a first port in communication with the indoor air environment and a second port in communication with the sub-slab environment via the channel defined in the lower end cap, the pressure sensor configured to measure a differential pressure between the indoor air environment and the sub-slab environment; and a sub-slab vent port secured to a lower surface of the lower end cap, the sub-slab vent port providing a barrier between the channel defined in the lower end cap and the sub-slab environment.

5. The sub-slab monitor of claim 4, further including communication circuitry contained within the housing, the communication circuitry for communicating differential pressure data from the pressure sensor to a computer.

6. A sub-slab monitor comprising:

a housing configured to extend through a foundation such that an upper surface of the housing is in contact with an indoor air environment and a lower surface of the housing is in contact with a sub-slab environment, the housing including an upper end cap, a lower end cap, the lower end cap defining a channel providing an opening to the sub-slab environment, and a body extending between the upper end cap and the lower end cap;

a pressure sensor contained within the housing, the pressure sensor configured to measure a differential pressure between the indoor air environment and the sub-slab environment; and electronics contained within the housing, the electronics including communication circuitry for communicating differential pressure data from the pressure sensor to a computer, and a battery;

wherein the upper end cap is larger than the body so as to function as a flange which can be sealed to the foundation;

wherein the lower end cap is flush with the foundation.

* * * * *